April 8, 1924.  
J. W. KAUFFMANN  
1,489,442  
PROCESS OF MAKING DUPLICATE PACKAGES OF HOPS  
Filed Jan. 18, 1923
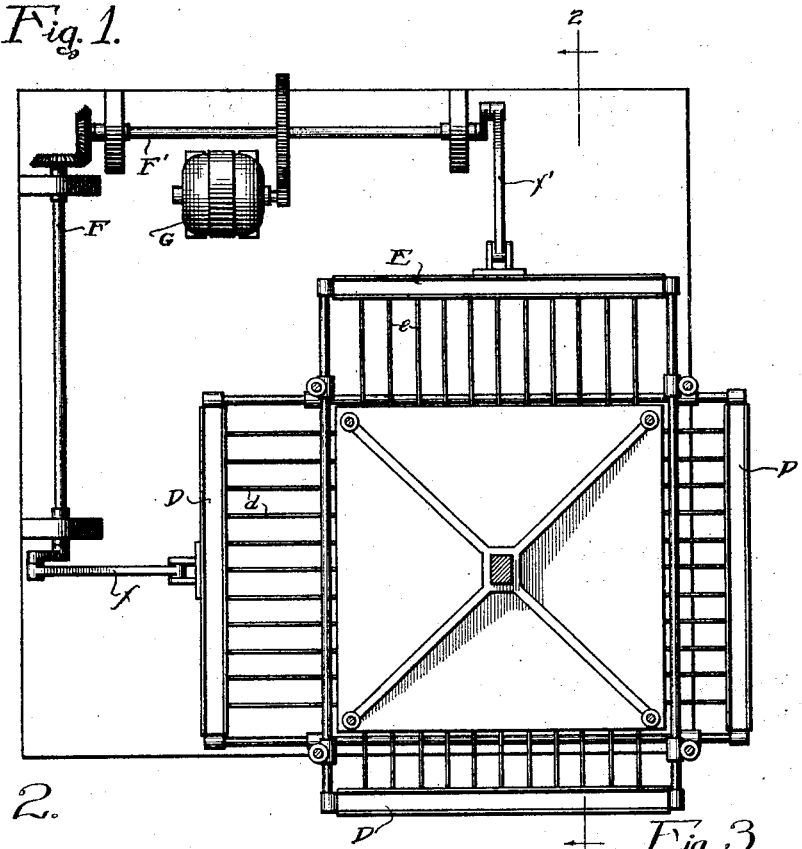
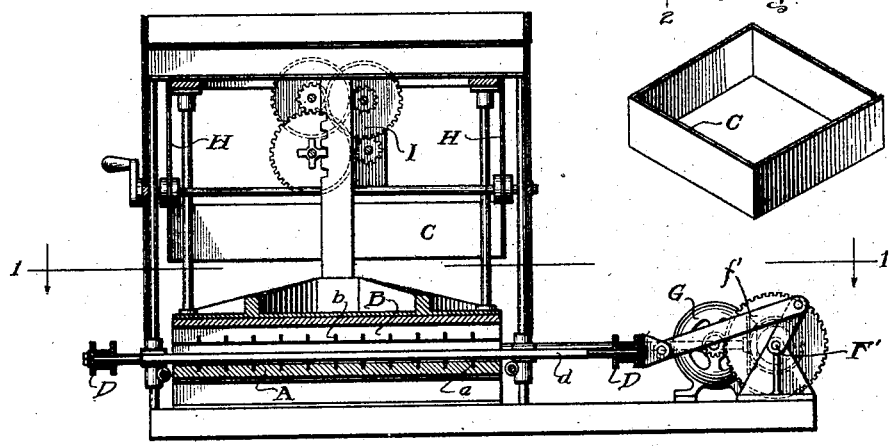
Inventor  
John W. Kauffmann  
By Charles Turner Brown  
Atty.

Patented Apr. 8, 1924.

1,489,442

UNITED STATES PATENT OFFICE.

JOHN W. KAUFFMANN, OF CHICAGO, ILLINOIS.

PROCESS OF MAKING DUPLICATE PACKAGES OF HOPS.

Application filed January 18, 1923. Serial No. 613,417.

*To all whom it may concern:*

Be it known that I, JOHN W. KAUFFMANN, a citizen of the United States, residing at Chicago, in the county of Cook and State of Illinois, have invented new and useful Improvements in Processes of Making Duplicate Packages of Hops, which has for its object to render the process more expeditious and considerably cheaper than has heretofore been done.

In making a large number of hop packages of equal weight, it is necessary to open a bale of pressed hops, to take a given quantity, by weight, therefrom, to subject said quantity to pressure, and then to separate the unit obtained thereby into a plurality of units, each of which is placed into a container, and this has hitherto been effected by subjecting the hops after the removal thereof from the bale to a considerably greater pressure than the same are subjected to in baling them.

In the process which I employ and seek to secure by these Letters Patent I do not have to subject the hops to any greater pressure than the same are subjected to in baling them, and I can make a large number of hop packages of equal weight and size in a single operation of the process.

In carrying out this process I make use of a machine which is sufficiently illustrated in the drawing accompanying and forming a part hereof to enable a description of the process which is herein set forth to be understood by one skilled in the art; and in said drawing—

Fig. 1 is a top plan section on line 1—1 of Fig. 2, viewed in the direction indicated by arrows;

Fig. 2 is a vertical section, on line 2—2 of Fig. 1, viewed as indicated by arrows.

Fig. 3 is a perspective, on a reduced scale, of a hopper which forms part of the machine.

A reference character applied to designate a given part indicates said part throughout the several figures of the drawing, wherever the same appears.

The machine is provided with a stationary presser board, A, and a movable presser board B, a hopper C, which may be raised and lowered, and which is sufficiently large to permit the movable presser board to be raised thereinto, and said hopper to be lowered, with the lower edge thereof below the upper edge or face of the stationary presser board. The machine is also provided with movable saw or cutter frames each thereof containing a plurality of cutting blades, preferably saws, under tension, and said frames are longitudinally movable at right angles to each other, with means to effect said movement. The presser boards contain slits and all said cutting blades may be contained in the slits in either one of said presser boards, and may be raised or lowered by the raising or lowering of said frames into the slits of the other of said presser boards, said slits being designated by the letters $a$, $a$, and $b$, $b$. Said cutting blades while moving from the slits in one of said presser boards to the slits in the other thereof separate the material between said presser boards into units, the number thereof being determined by the number of cutting blades in said frames. In the drawing I have illustrated a frame D containing eleven cutting blades $d$, $d$, arranged to be moved rectilineally, and a frame E, at right angles to said frame D, also arranged to contain eleven cutting blades, $e$, $e$, which also may have rectilineal movement. With said number of cutting blades I obtain one gross of packages by a single operation of the process.

The machine also comprises crank shafts F, F', and means to rotate said shafts, as motor G, and pitmen $f$, $f'$, which pitmen are respectively mounted on the cranks of the crank shafts, and pivotally connected to the frames D, E. Means are also provided, as cables H, H, to control the raising and lowering of said hopper C, and for raising the movable presser board B, and forcing it down on to material contained in the hopper C, when said hopper is lowered, and resting on the lower presser board, as for instance, the reducing gear I.

In carrying out this process the movable presser board is raised, and the hopper is lowered so that the lower edge thereof is below the upper face of the lower presser board. At this time the cutter blades are in the slits in the lower presser boards. A sheet of dry pulp material, preferably straw board or paper, is then placed in the hopper on the lower presser board, covering the slits in said board. A bale of pressed hops being opened, a quantity thereof, determined by weight, is transferred from the opened bale into the hopper, and distributed evenly on said dry pulp material. An additional sheet of dried pulp material is then placed on the hops in the hopper, and the movable presser board is lowered on to said last named sheet. Force is then applied to said presser board, as by means of the reducing gear I, until the pressure obtained is approximately the same as the pressure applied to the hops in baling them. The hopper is then raised to above the upper and movable presser board B, and the shafts F, F', are rotated to move the frames D and E, and give a rectilineal movement to the cutting blades d, d, and e, e, which movement is preferably continued until said cutting blades are in the slits b, b, in the upper presser board B, after which said cutter blades and frames D, E, are again lowered until said cutting blades are in the slits a, a, in presser board A. The upper presser board B, is then raised so that access may be had to the plurality of units, each thereof comprising a sheet of dried pulp material, hops under pressure, and an additional sheet of dried pulp material resting thereon. All said packages are preferably then removed from the lower presser board by sliding them therefrom on to a flat sheet which forms a tray, and said tray is preferably placed on a table. The packages are then separately taken from the tray, said sheets of dried pulp material forming a medium which permits the several packages to be handled without disarranging or breaking the hop units, and said packages, including the sheets of dried pulp material, are deposited in containers of suitable size. The sheets of dried pulp material, preferably strawboard, have several functions, first, to prevent hops from entering the slits in the presser boards before and during the application of pressure thereto; secondly to permit the handling of the plurality of units obtained while transferring said units to containers by persons not particularly skilled in the art without breaking or crumbling the hop units; and thirdly, to reinforce the sides of the containers which must resist the expansion of the hops, which gradually occurs after said hops in their compressed condition, are placed therein. I find that by this process the several packages may be placed in cartons, to serve as containers, and that no appreciable change of shape of said cartons will take place, and that the appearance of the hops in said cartons will closely resemble the appearance thereof in the original bales, and that a large number of said packages may be made in a comparatively short time, and placed in containers.

An additional function of the sheets of dried pulp material, is, to prevent the hops from sticking to the presser boards. In the re-pressing of the hops hereinbefore recited, a resinous substance contained on the surface of the hop leaves, or exuded therefrom by said pressure, causes the hops to adhere to surfaces with which they come in contact, and by providing the sheets of dried pulp material, as recited, the hops on the faces thereof in contact with said sheets adhere thereto sufficiently to materially assist in the handling of the hop units in transferring said units to containers while, at the same time, said sheets being interposed between the several units and the presser boards, prevent hops adhering to the presser boards.

It is of course, understood that if desired, pressure may be applied to the hops in excess to the pressure applied thereto in baling the hops; but in order to preserve the same appearance in the hops subsequent to the application of this process thereto as exists while the hops are in the bale, the pressure applied in the process should not be to any considerable extent greater than the pressure applied in baling the hops.

I claim:

1. The process of obtaining a plurality of units of hops, under pressure, which comprises the placing of a sheet of dried pulp material below a determined quantity of hops and a sheet of dried pulp material above said quantity of hops, in subjecting said sheets and said hops to pressure, and in then separating the unit obtained thereby into a plurality of units.

2. The process of obtaining a plurality of units of hops under pressure, which comprises the placing of a determined quantity of hops on a sheet of dried pulp material, of evenly distributing said hops over said sheet, in placing a sheet of dried pulp material over said hops, in subjecting said sheets and said hops to pressure, and in separating the unit obtained thereby into a plurality of units, each having a sheet of dried pulp material on the under and upper sides thereof, and placing each of said units comprising said hops in a compressed condition and said sheets, in a container.

3. The process of obtaining packages of hops in a compressed condition which comprises the placing of a determined quantity of hops on a sheet of dried pulp material, in evenly distributing said hops on said sheet, in placing an additional sheet of dried pulp material on said hops, in subjecting said sheets and said hops to pressure, in separating said hops and sheets while under said pressure into a plurality of units, each of said units comprising hops under pressure with a sheet of dried pulp material on the under and upper sides thereof, in then releasing the pressure therefrom, and in placing each of said units in a container.

4. The process of obtaining packages of hops in a pressed condition corresponding with the density of baled hops which comprises the opening of said baled hops and the placing of a determined quantity of hops broken from said baled hops on a sheet of dried pulp material and evenly distributing said hops over said sheet, in placing an additional sheet of dried pulp material over said evenly distributed hops, in subjecting said sheets and the hops between them to pressure, to compress said hops correspondingly with the compression of said hops in said bale, in separating said sheets and said hops, while under said pressure, into a plurality of units, each unit consisting of hops under pressure and a sheet of dried pulp material under and above said hops, in removing said pressure from said units and in placing each of said units in a corresponding container.

JOHN W. KAUFFMANN.

Witnesses:
   Bess Brown,
   Charles Turner Brown.